(12) United States Patent
Samejima et al.

(10) Patent No.: US 7,059,109 B2
(45) Date of Patent: Jun. 13, 2006

(54) MID-MOUNT MOWER HAVING A MOWER UNIT DISPOSED BETWEEN A FRONT WHEEL UNIT AND A PAIR OF RIGHT AND LEFT REAR WHEELS ARRANGED REARWARDLY OF A VEHICLE BODY TO BE INDEPENDENTLY SHIFTABLE

(75) Inventors: Kazuo Samejima, Sakai (JP); Masato Asahara, Sakai (JP); Hiroshi Shimada, Sakai (JP); Akira Minoura, Sakai (JP); Yoshikazu Togoshi, Sakai (JP); Osami Fujiwara, Sakai (JP); Yoshiyuki Esaki, Sakai (JP)

(73) Assignee: Kubota Corporation (JP)

( * ) Notice: Subject to any disclaimer, the term of this patent is extended or adjusted under 35 U.S.C. 154(b) by 15 days.

(21) Appl. No.: 10/649,332

(22) Filed: Aug. 26, 2003

(65) Prior Publication Data
US 2004/0154278 A1 Aug. 12, 2004

(30) Foreign Application Priority Data
Feb. 10, 2003 (JP) .............................. 2003-032271

(51) Int. Cl.
*A01D 34/03* (2006.01)
(52) U.S. Cl. ...................................................... 56/17.1
(58) Field of Classification Search .................. 56/6, 56/15.1, 15.2, 15.3, 16.7, 17.1, 320.1, DIG. 22, 56/12.7
See application file for complete search history.

(56) References Cited

U.S. PATENT DOCUMENTS 3,589,450 A * 6/1971 Price ........................... 172/273
4,737,067 A * 4/1988 Samejima et al. ............ 414/686
4,977,733 A * 12/1990 Samejima et al. ............ 327/408
5,483,789 A * 1/1996 Gummerson .................. 56/15.5
5,771,672 A * 6/1998 Gummerson .................. 56/15.4
6,276,119 B1 * 8/2001 Oshima et al. ............... 56/17.1
2004/0006959 A1   1/2004 Samejima et al.

* cited by examiner

Primary Examiner—Thomas B. Will
Assistant Examiner—Alicia Torres
(74) Attorney, Agent, or Firm—The Webb Law Firm

(57) ABSTRACT

A mid-mount mower having a front frame unit including a pair of right and left front longitudinal frames, a first cross frame interconnecting the front longitudinal frames in forward positions thereof longitudinally of the vehicle body, and a second cross frame interconnecting the front longitudinal frames in rearward positions thereof longitudinally of the vehicle body, the front frame unit supporting the front wheel unit and also supporting a lift mechanism for vertically movably suspending the mower unit; a rear frame unit including a pair of right and left rear longitudinal frames, the rear frame unit being connected to the front frame unit; and a rear wheel drive unit interconnecting the rear longitudinal frames. The second cross frame has a downwardly opening recess disposed adjacent a middle position thereof, the recess allowing entry thereto of an upwardly protruding portion of the mower unit without interference when the mower unit is raised by the lift mechanism. The second cross frame includes a first profile member (13a) having a gate-shape portion (13aa) defining a recess (28) and horizontal plate portions (13ab) connected respectively to lower ends of the gate-shape portion, and a vertical plate member (13b) connected to a rear end surface of the first profile member.

10 Claims, 16 Drawing Sheets

MID-MOUNT MOWER HAVING A MOWER UNIT DISPOSED BETWEEN A FRONT WHEEL UNIT AND A PAIR OF RIGHT AND LEFT REAR WHEELS ARRANGED REARWARDLY OF A VEHICLE BODY TO BE INDEPENDENTLY SHIFTABLE

BACKGROUND OF THE INVENTION

1. Field of the Invention

This invention relates to a mid-mount mower having a mower unit mounted between a front wheel unit and a pair of right and left rear wheels arranged rearwardly of a vehicle body to be independently shiftable.

2. Description of the Related Art

A riding mid-mount mower, known from Japanese Unexamined Patent Application Publication 2000-351330, includes a body frame having a pair of right and left front longitudinal frames and a pair of right and left rear longitudinal frames. The front longitudinal frames support front wheels and suspend a mower unit through links. Each rear longitudinal frame is connected to a rear wheel drive section. The right and left front longitudinal frames are connected to each other through forward and rearward cross frames. The front longitudinal frames and the rear longitudinal frames are connected through the rearward cross frame.

A riding mower keeps a mower unit in a raised position during a non-operational run. When the mower runs over a rough terrain or rides over a curb, it is desirable to raise the mower unit to a higher position to avoid contact with the ground. In this type of mower, a gear case is protrusively mounted on a deck of the mower unit to convert torque transmitted in a longitudinal direction from a PTO shaft disposed in a rear part of the vehicle body, into rotation of a vertical shaft for transmission to rotary blades arranged in the mower deck. A limit to the raising of the mower unit is determined by interference between the vehicle body and the gear case or a shaft transmission system connected to the gear case.

In a conventional riding mower, a footboard is disposed on front longitudinal frames of the vehicle body with a mower unit suspended therefrom. Where the body frame is positioned higher for elevating the limit to the raising of the mower unit, the center of gravity of the vehicle body is raised and, as a result, the vehicle body is destabilized. Conversely, where the vehicle body is positioned lower in favor of stability of the vehicle body, the height of the raised mower unit relative to the ground is also lowered. Thus the vehicle body stability and the sufficient mower unit height have been incompatible.

SUMMARY OF THE INVENTION

This invention has been made having regard to the state of the art noted above, and its object is to provide a riding mower of excellent stability and running performance, which secures a sufficient height of a mower unit relative to the ground while allowing a vehicle body to have a low center of gravity.

The above object is fulfilled, according to this invention, by a riding mower has a front frame unit for supporting a front wheel unit and a rear frame unit connected to the front frame unit. The front frame unit includes a pair of right and left front longitudinal frames, a first cross frame for interconnecting the front longitudinal frames in forward positions thereof longitudinally of the vehicle body, and a second cross frame for interconnecting said front longitudinal frames in rearward positions thereof longitudinally of the vehicle body, and the rear frame unit includes a pair of right and left rear longitudinal frames. The front frame unit is capable of carrying a lift mechanism for vertically movably suspending the mower unit. A rear wheel drive unit interconnects the rear longitudinal frames. The second cross frame has a downwardly opening recess disposed adjacent a middle position thereof, the recess allowing entry thereto of an upwardly protruding portion of the mower unit without interference when the mower unit is raised by the lift mechanism.

With the above construction, when the mower unit is raised, the upwardly protruding portion (e.g. a gear case protrusively mounted on the upper face of a mower deck, and a shaft transmission system connected thereto) enters from below the recess formed adjacent a middle position in the right and left direction of the second cross frame. That is, even where the vehicle body is positioned low, the upwardly protruding portion of the mower unit may enter the recess of the second cross frame, and the mower unit may be raised high. The riding mower according to this invention is capable of raising the mower unit sufficiently high relative to the ground while keeping low the center of gravity of the vehicle body.

In this invention, in order to make the second cross frame strong enough in spite of the recess formed thereon, the second cross frame includes a first profile member having a gate-shape portion defining a recess and horizontal plate portions connected respectively to lower ends of the gate-shape portion, and a vertical plate member connected to a rear end surface of the first profile member. Further, the horizontal plate portions are arranged to receive rear ends of a footboard sheet member disposed as sunken between the right and left front longitudinal frames, and the vertical plate member having an upper end thereof supporting a pivotal axis of a driver's seat.

In order to provide the second cross frame with a substantially box shape section, the second cross frame, in a preferred embodiment of the second cross frame, includes a first profile member having a gate-shape portion defining a recess and horizontal plate portions connected respectively to lower ends of the gate-shape portion, a tilted vertical plate member connected to a rear end surface of the first profile member, a rear wall member connected to a rear end of the tilted vertical plate member to define therewith an internal space extending transversely of the vehicle body, and side plates for covering the internal space from lateral directions.

Other features and advantages of this invention will be apparent from the following description of the embodiment to be taken with reference to the drawings.

DESCRIPTION OF THE PREFERRED EMBODIMENTS

Figure 1:
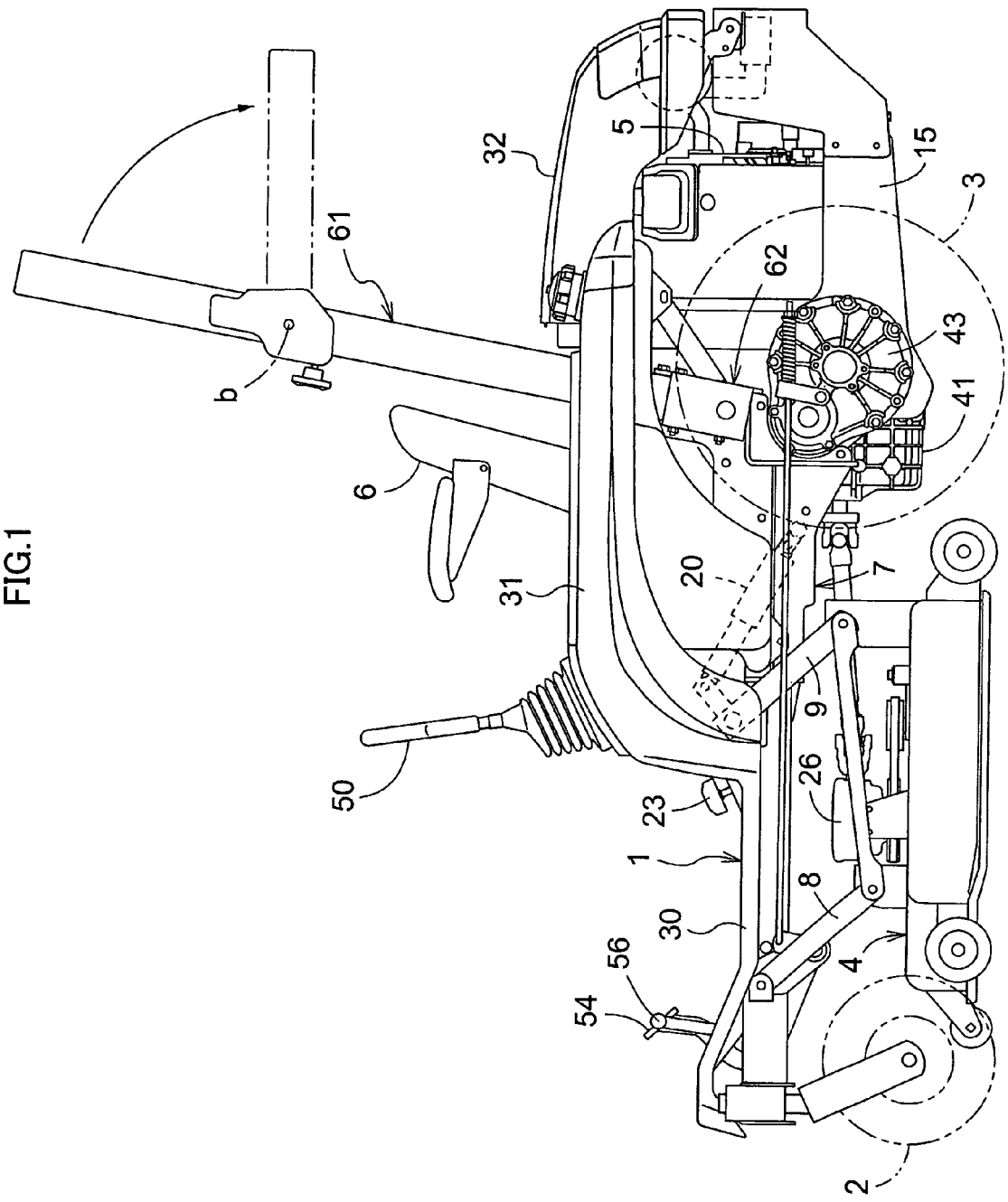
FIG. 1 is a left side view of a riding mid-mount mower.
Figure 2:
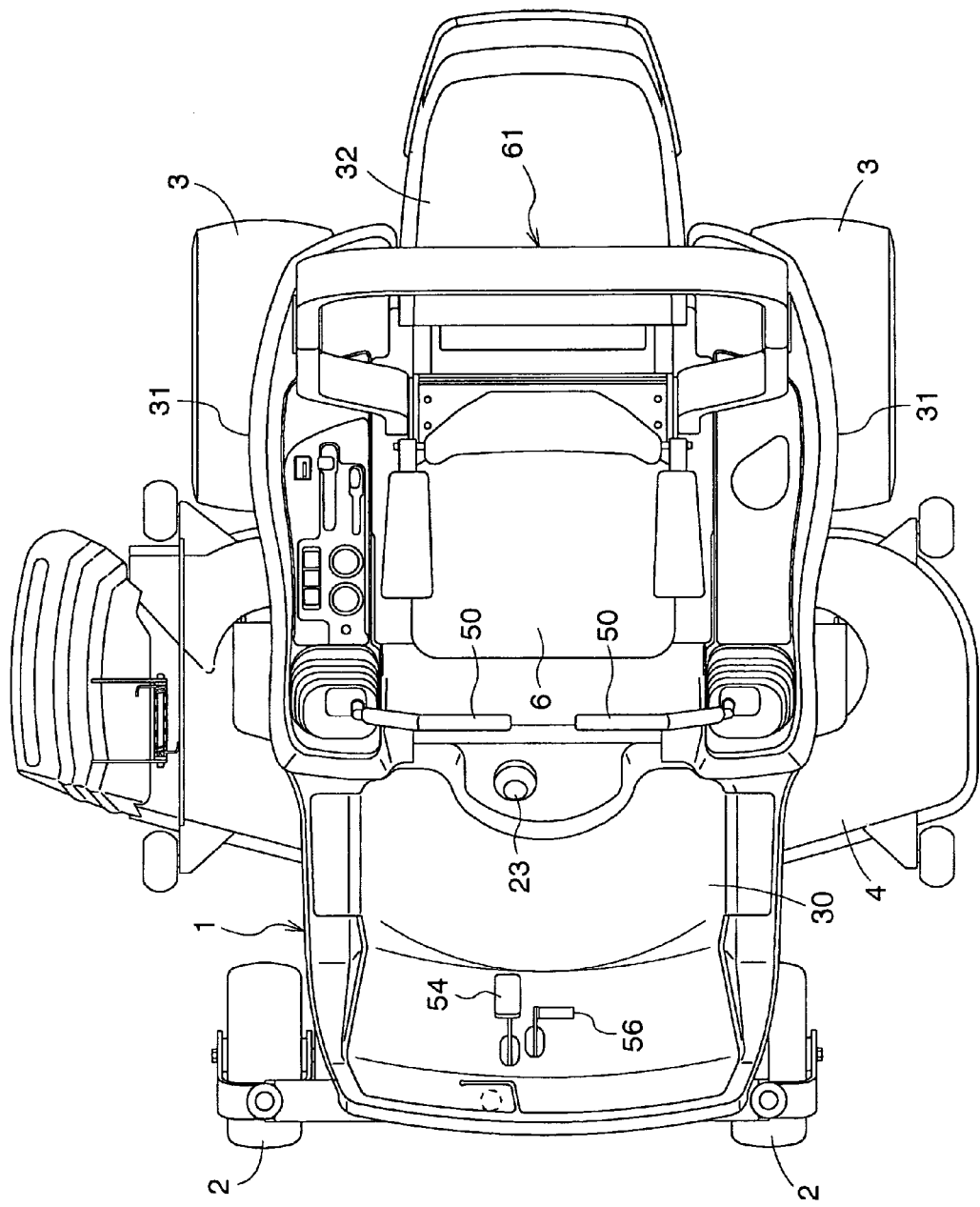
FIG. 2 is a plan view of the riding mid-mount mower.

FIG. 1 shows a side view and FIG. 2 shows a plan view of a riding mid-mount mower according to the invention. In this lawn mower, a vehicle body for riding 1 has a pair of right and left front wheels 2 and rear wheels 3, and a mower unit 4 vertically movably suspended between the front and rear wheels. An engine 5 is mounted at a rearmost part of the vehicle body 1, and a driver's seat 6 is placed on a longitudinally middle part of the vehicle body. The pair of right and left front wheels 2 are in the form of freely rotatable caster-type wheels, and the pair of right and left rear wheels 3 are drive wheels independently and steplessly changeable in speed and switchable between forward drive and backward drive. By driving both rear wheels 3 at the same speed forward or backward, the vehicle may be controlled to run straight forward or backward, and by driving the right and left rear wheels 3 at different speeds, the vehicle may be controlled to turn in any direction.

Figure 3:
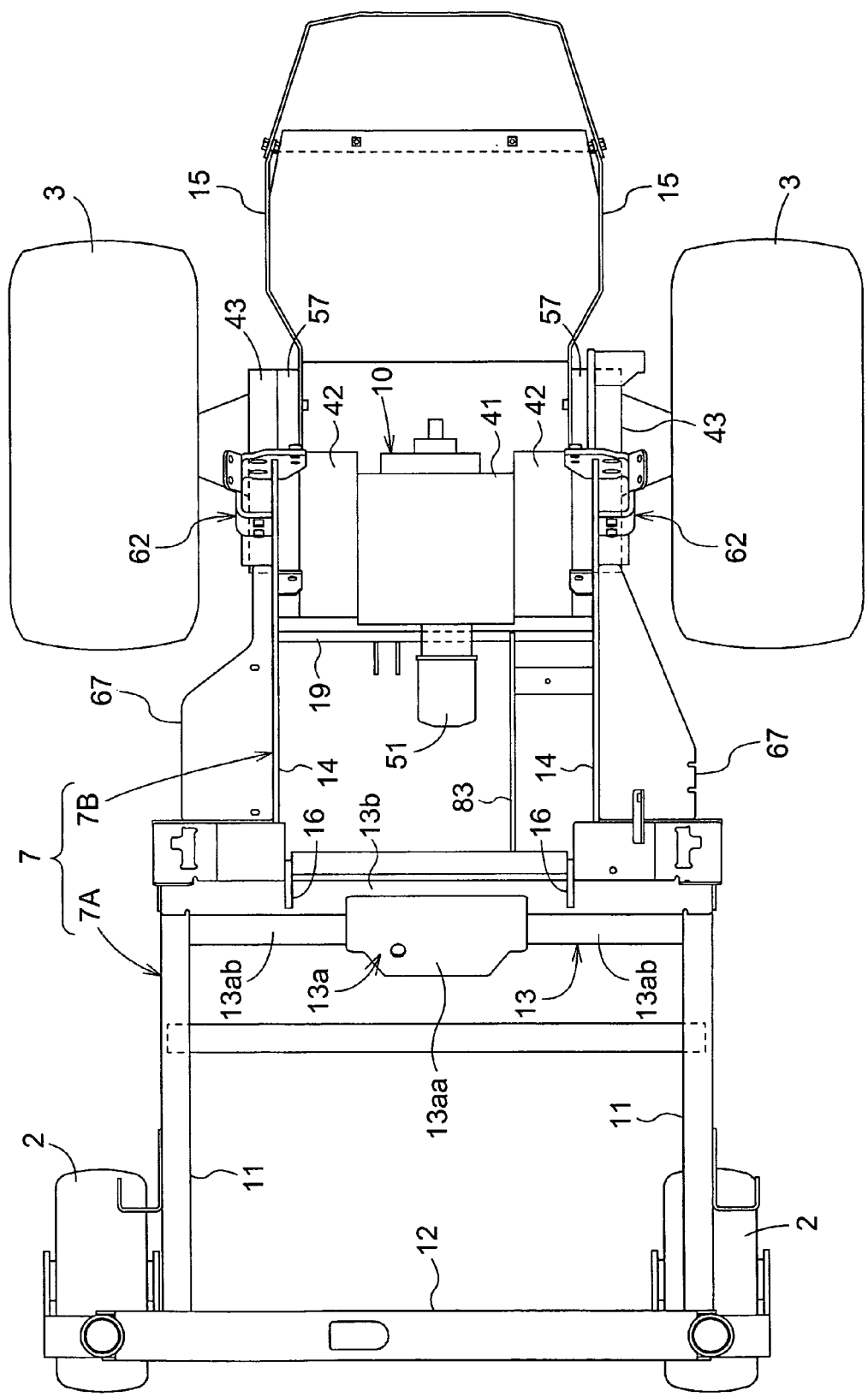
FIG. 3 is a plan view of a body frame assembly.
Figure 4:
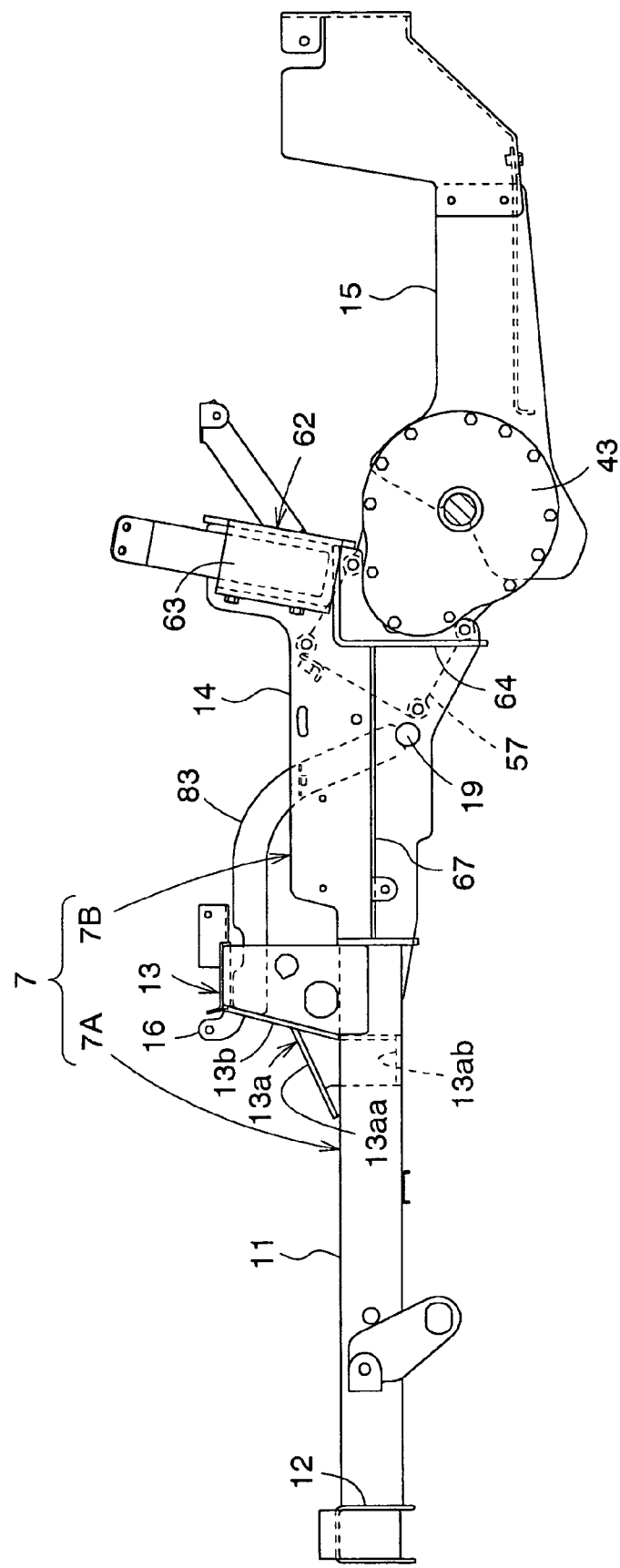
FIG. 4 is a side view of the body frame assembly.

As shown in FIGS. 3 and 4, a body frame assembly 7 of the vehicle body 1 consists of a front frame unit 7A supporting the front wheels 2 and suspending the mower unit 4 through front and rear links 8 and 9, and a rear frame unit 7B having a rear wheel drive section 10 connected thereto. The front frame unit 7A includes a pair of right and left front longitudinal frames 11 composed of channels opposed to each other with a wide spacing therebetween, a first cross frame 12 composed of a channel interconnecting front ends of the right and left front longitudinal frames 11, and a second cross frame 13 interconnecting rear ends of the right and left front longitudinal frames 11. The rear frame unit 7B includes a pair of right and left rear longitudinal frames 14 composed of flat plates arranged with a smaller spacing therebetween than that of the front frame unit 7A and connected to the second cross frame 13. The rear wheel drive section 10 is connected to rear ends of the longitudinal frames 14. The engine 5, which is an air-cooled gasoline engine, is mounted, with an output axis thereof extending in the longitudinal direction, on an engine-mounting frame 15 extending rearward from the rear wheel drive section 10.

Figure 5:
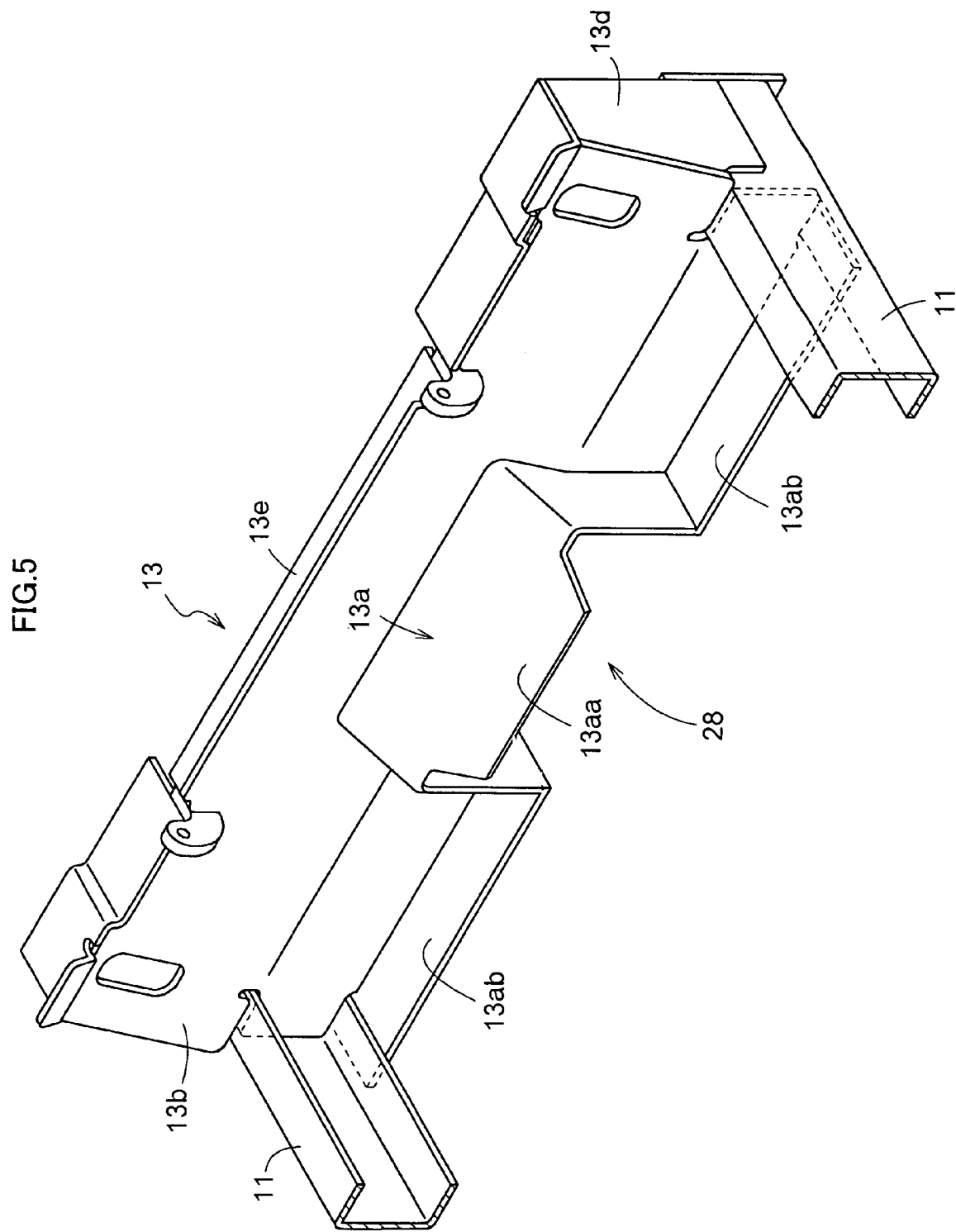
FIG. 5 is a perspective view of a second cross frame.

As shown in detail in FIG. 5, the second cross frame 13 is a welded metal plate structure protruding above the front longitudinal frames 11, including a first profile member 13a having a gate-shape portion 13aa defining a recess 28 and horizontal plate portions 13ab connected to lower ends of the gate shape-portion, a tilted vertical plate member 13b connected to a rear end face of the first profile member 13a, a rear wall member 13e connected to the rear end of the tilted plate member 13b to create therewith an internal space extending transversely of the vehicle body, and side plates 13d for covering the internal space from lateral directions. An upper part of a transversely middle portion of the tilted plate member 13b forming the second cross frame 13 is connected to a stay 19 through an arch-shaped reinforcing plate 83.

Figure 6:
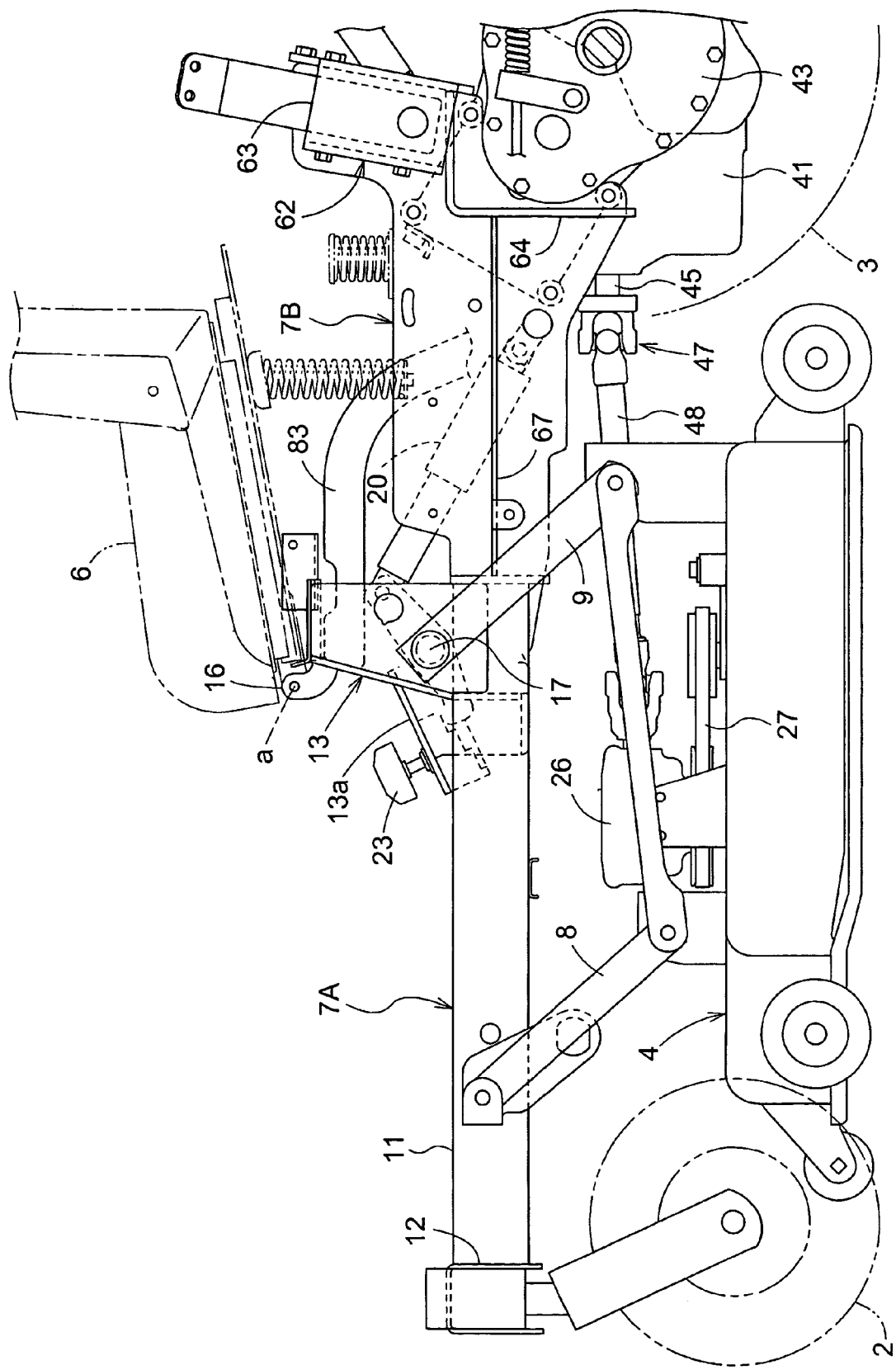
FIG. 6 is a side view of a mower-unit mounting section with a mower unit in a lowered position.
Figure 7:
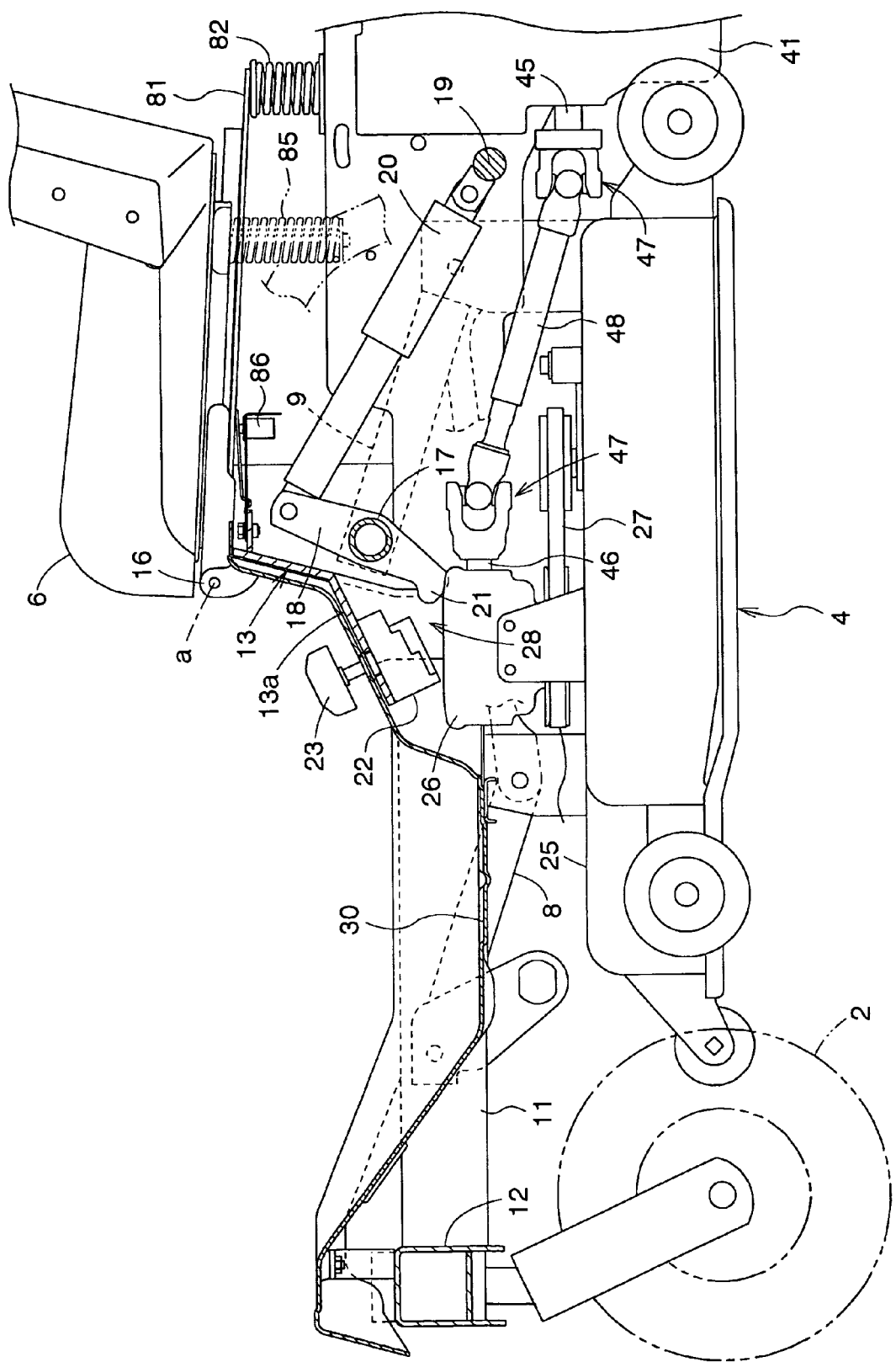
FIG. 7 is a side view of a mower-unit mounting section with the mower unit in a raised position.
Figure 8:
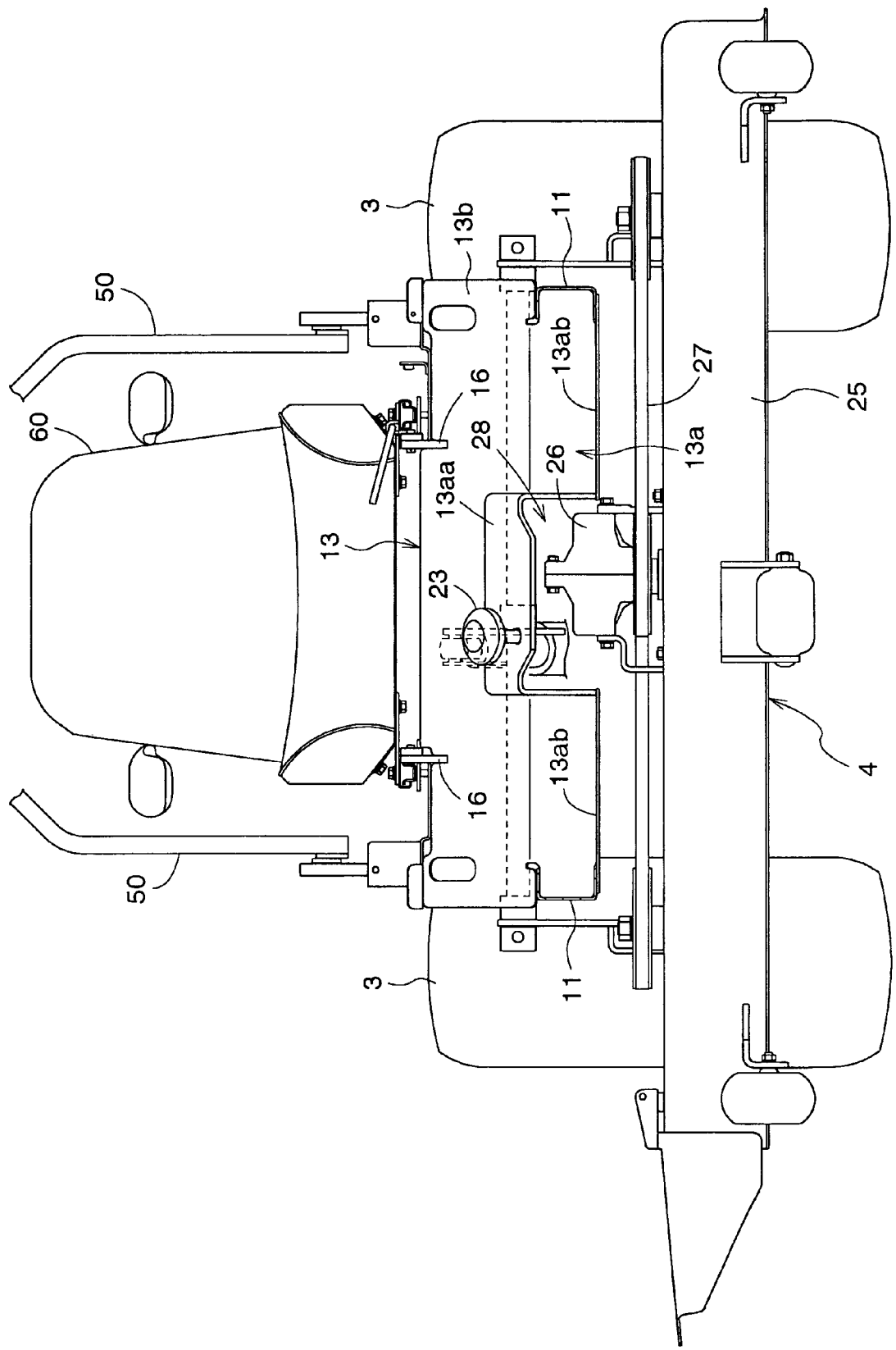
FIG. 8 is a front view of a mower-unit mounting section with the mower unit in the raised position.

As shown in FIGS. 6 through 8, the tilted plate member 13b forming the second cross frame 13 has fulcrum metal fittings 16 disposed on front parts thereof for supporting the driver's seat 6 to be pivotable about an axis "a". The driver's seat 6 is placed above the rear frame unit 7B so that the front end thereof reaches above the second cross frame 13.

A support shaft 17 extending transversely through the internal space of and supported by the second cross frame 13 is connected to upper ends of the rear links 9 for suspending the mower unit 4. A single-acting hydraulic cylinder 20 is mounted between a drive arm 18 fixed to the support shaft 17 and the stay 19 interconnecting the right and left rear longitudinal frames 14. When the hydraulic cylinder 20 is extended by pressure oil supplied thereto, the rear links 9 are swung upward to raise the mower unit 4, and when the hydraulic cylinder 20 is contracted by the pressure oil drained therefrom, the mower unit 4 descends by gravity. A restraining arm 21 extending from the drive arm 18 limits the descent of the mower unit 4 by abutting on a stopper 22 having stepped contacts formed by a spiral. The stopper 22 may be turned by a knob 23 to change a contact position stepwise to receive the restraining arm 21, thus adjusting the height of the suspended mower unit 4 relative to the ground, i.e., the cutting height.

The mower unit 4 is constructed so that three blades (not shown) driven to rotate about vertical axes are transversely arranged in a deck 25, and grass clippings are discharged through the right end of the deck 25. A gear case 26 is centrally disposed on the upper face of the deck 25, and changes torque inputted from rearward into rotation about a vertical axis for transmission to each blade through a drive belt 27.

As shown in FIGS. 7 and 8, when the mower unit 4 is raised, the gear case 26 and/or a universal joint 47 may enter the downwardly opened recess 28 defined by the gate-shape portion 13aa positioned in a transversely middle region of the first profile member 13a forming the second cross frame 13. In this way, the mower unit 4 may be raised to a large extent to secure a good height over the ground.

Figure 9:
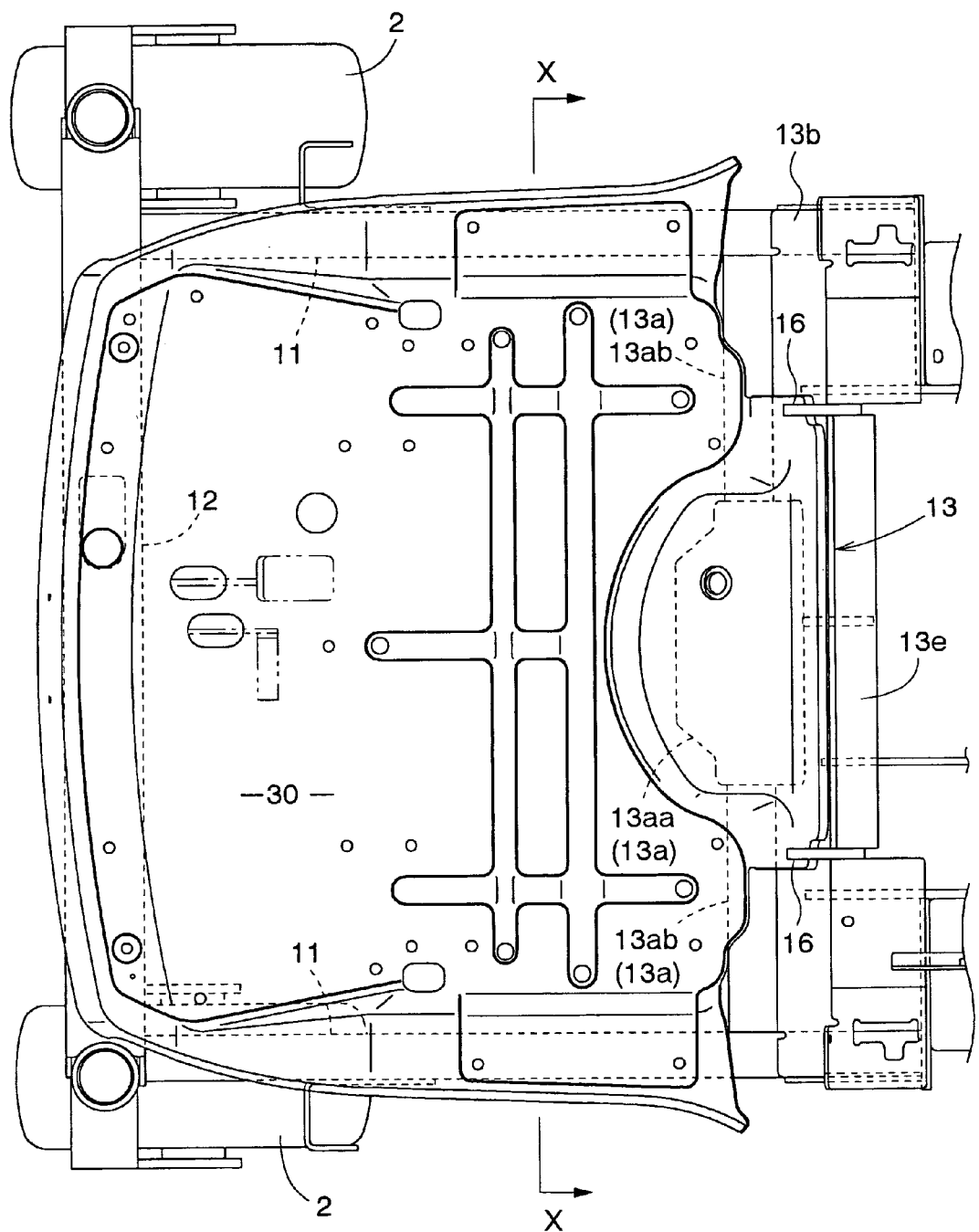
FIG. 9 is a plan view of a forward portion of the body frame.
Figure 10:
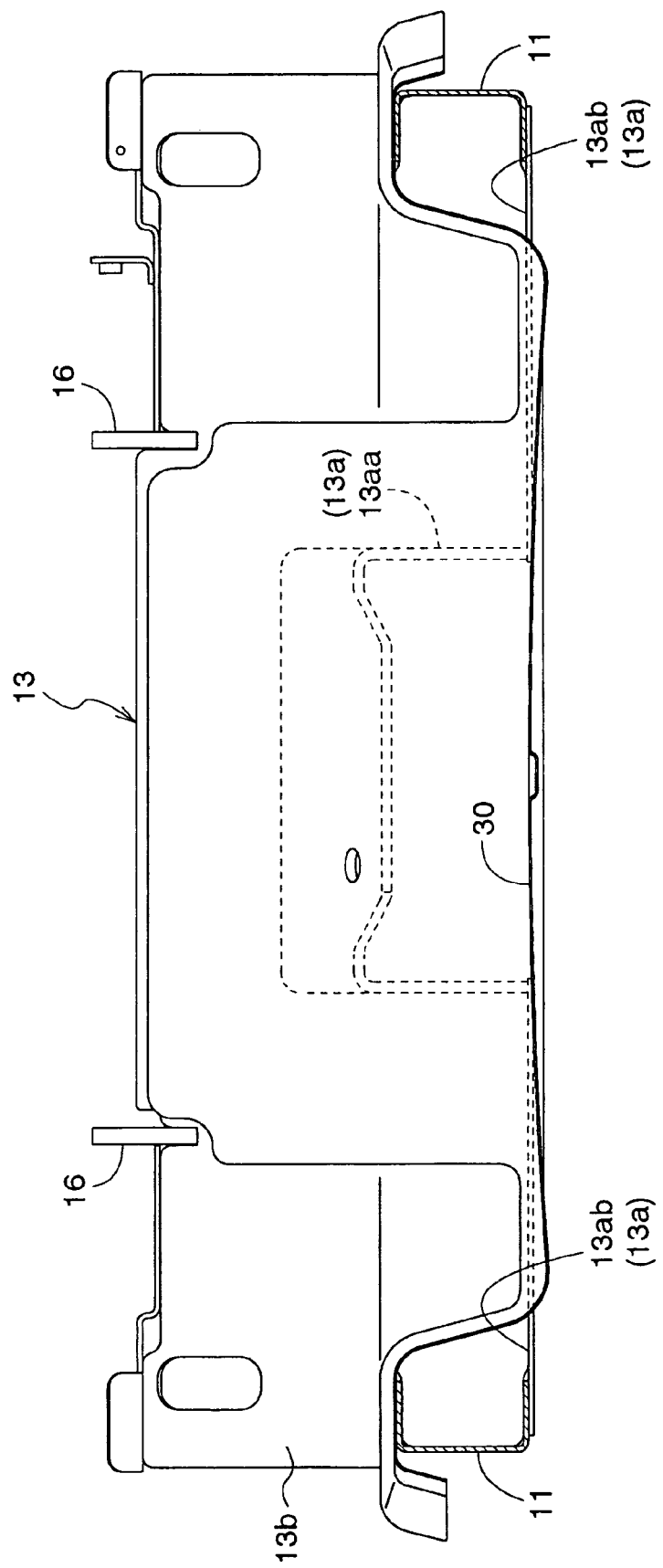
FIG. 10 is a section taken along line X—X of FIG. 9.

A footboard 30 made of metal plate is fitted to the front frame unit 7A of the body frame assembly 7 in a position under the driver's feet. A pair of rear wheel fenders 31 are disposed, respectively, at the right and left sides of the driver's seat 6. An engine hood 32 is provided behind the driver's seat 6. Further, as shown in FIGS. 9 and 10, the footboard 30 mounted to cover the front frame unit 7A is pressed to a shape having a sunken portion between the right and left front longitudinal frames 11, and thus the footboard level is low enough to allow the driver to be seated a well-balanced condition with a low center of gravity. Rear end portions of the footboard 30 are mounted on and connected to the horizontal plate portions 13ab of the first profile member 13a forming the second cross frame 13. The middle part at the rear end of the footboard 30 is bulged along the shape of the gate-shape portion 13aa of the first profile member 13a to fittingly cover the gate-shape portion 13aa.

Figure 11:
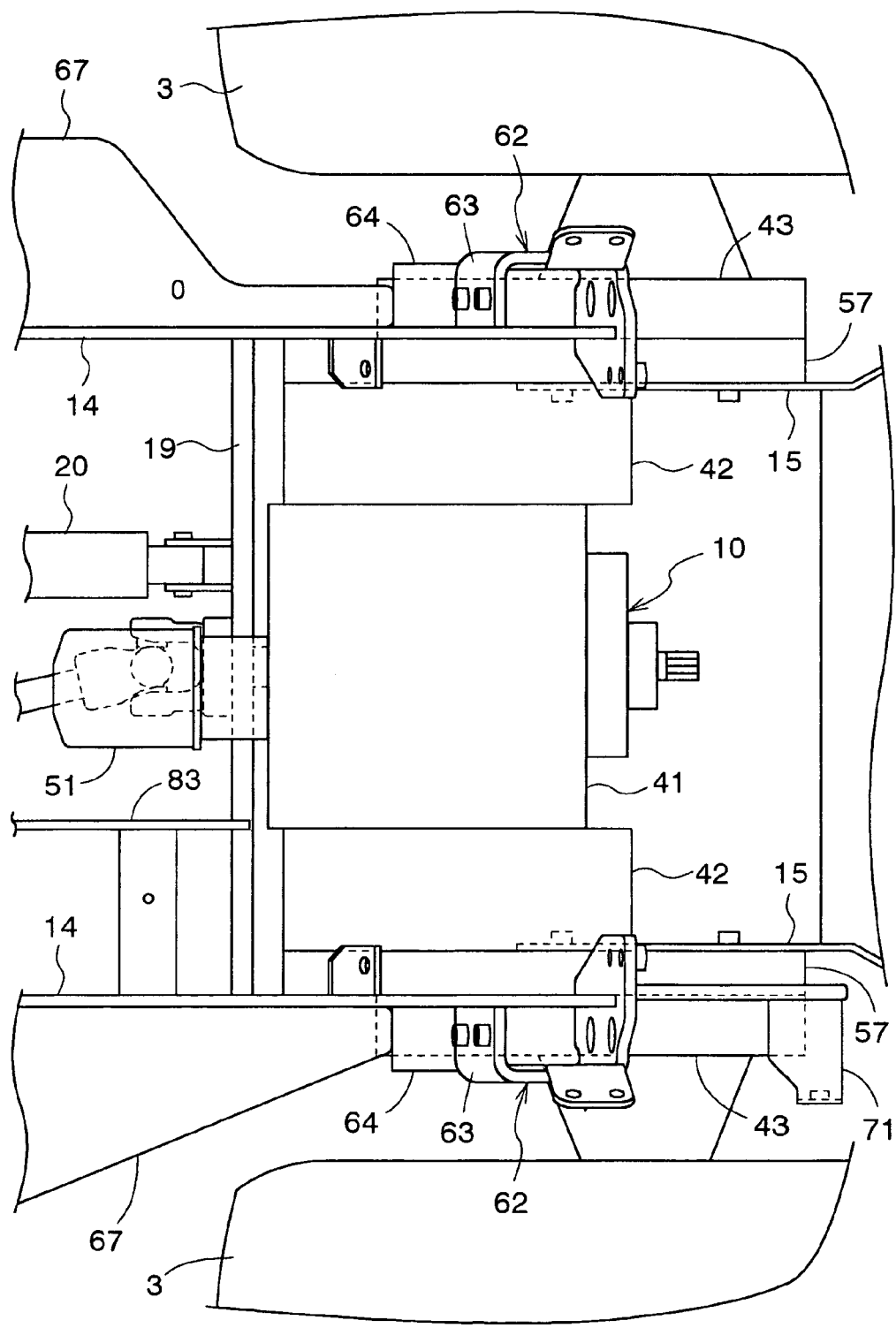
FIG. 11 is a plan view showing a rear wheel drive section.
Figure 12:
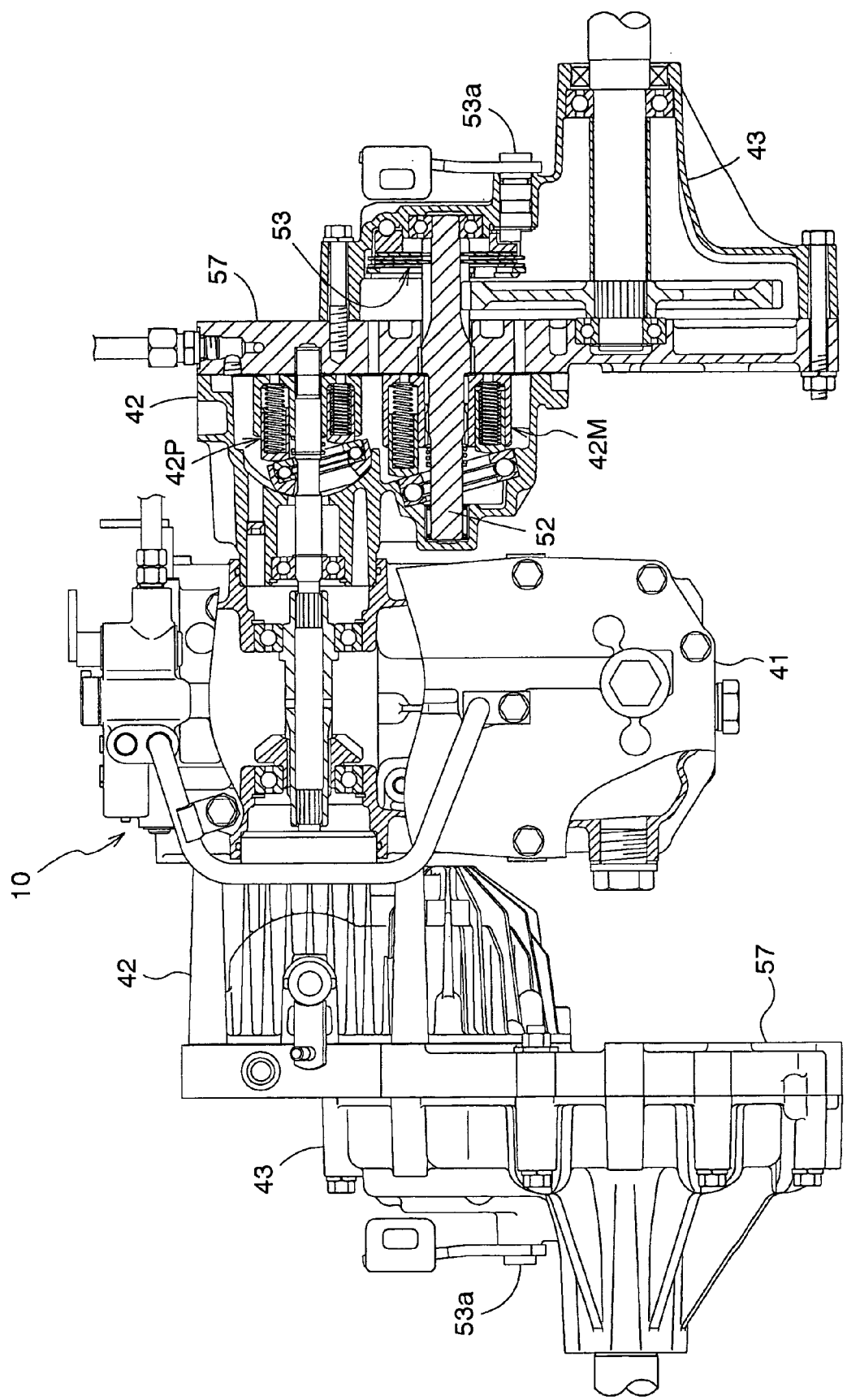
FIG. 12 is a rear view, partly in section, of the rear wheel drive section.
Figure 13:
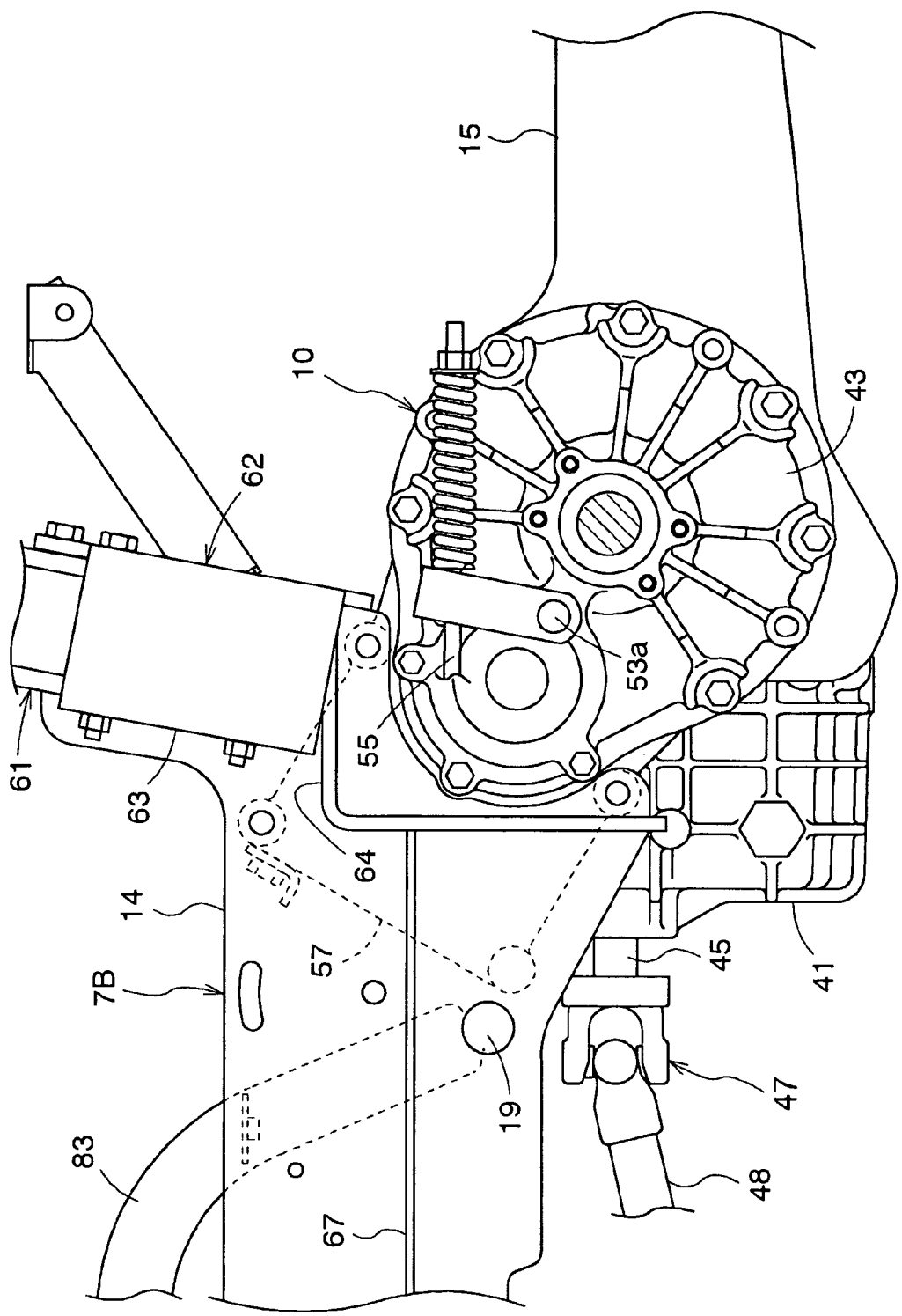
FIG. 13 is a left side view of the rear wheel drive section.

As shown in FIGS. 11 through 13, the rear wheel drive section 10 includes a central transmission case 41 for receiving output from the engine 5, a pair of hydrostatic stepless transmissions (HST) 42 attached to right and left sides of the central transmission case 41, and a pair of right and left reduction cases 43 supporting the axles of rear wheels 3. Engine power inputted to the central transmission case 41 through its rearward part is divided and transmitted to right and left variable displacement pumps 42P of stepless transmissions 42. Outputs in varied speeds from motors 42M of the stepless transmissions 42 are decelerated through the reduction cases 43 and transmitted to the axles of the rear wheels 3. A PTO shaft 45 projects forward from the front face of the central transmission case 41, to be operatively connected to a rearwardly projecting input shaft 46 of the gear case 26 through a pair of universal joints 47 and a transmission shaft 48.

The hydrostatic stepless transmissions 42 employed herein are the well-known axial plunger type, with the swash plate angle of each pump 42P variable to vary the volume and direction of oil delivery, whereby the motor 42 may be driven forward and backward in steplessly variable speed. Swash plate angle control shafts, not shown in the drawings, are operatively connected to shift levers 50 arranged at opposite sides of the driver's seat 6 to be rockable backward and forward. The shift levers 50 held in neutral position place the stepless transmissions 42 in neutral stop position. When the shift levers 50 are rocked forward from the neutral position, the stepless transmissions 42 are shifted to forward drive speed positions. When the shift levers 50 are rocked rearward from the neutral position, the stepless transmissions 42 are shifted to backward drive speed positions. In front of the central transmission case 41, an oil filter 51 is disposed on an oil supply line for supplying pressure oil to a charging circuit of hydrostatic stepless transmissions 42. By rocking the driver's seat 6 forward to open the upper part of the rear wheel drive section 10, the oil filter 51 is fully exposed in a position between the pair of right and left rear longitudinal frames 14, and may easily be mounted and dismounted with hands reaching from above.

The right and left reduction cases 43 are provided, respectively, with multiple disk brakes 53 acting on motor shafts 52. Control shafts 53a of the brakes 53 are operatively connected through rods 55 to a brake pedal 54 disposed around a middle forward part of the footboard. The brake pedal 54, when depressed, actuates the right and left brakes 53 at the same time. Further, a brake lock pedal 56 for parking is disposed laterally of the brake pedal 54 to hold the brake pedal 54 in a depressed position.

Port blocks 57, having the hydraulic circuits of the hydrostatic stepless transmissions 42 inside, are formed of high strength castings that also serve as covers for reduction cases 43. To the outward side of each port block 57, the rear end of the rear longitudinal frame 14 forming the rear frame unit 7B of the body frame assembly 7 is connected. To the inward side of each port block 57, the front end of the engine-mounting frame 15 is connected.

Figure 14:
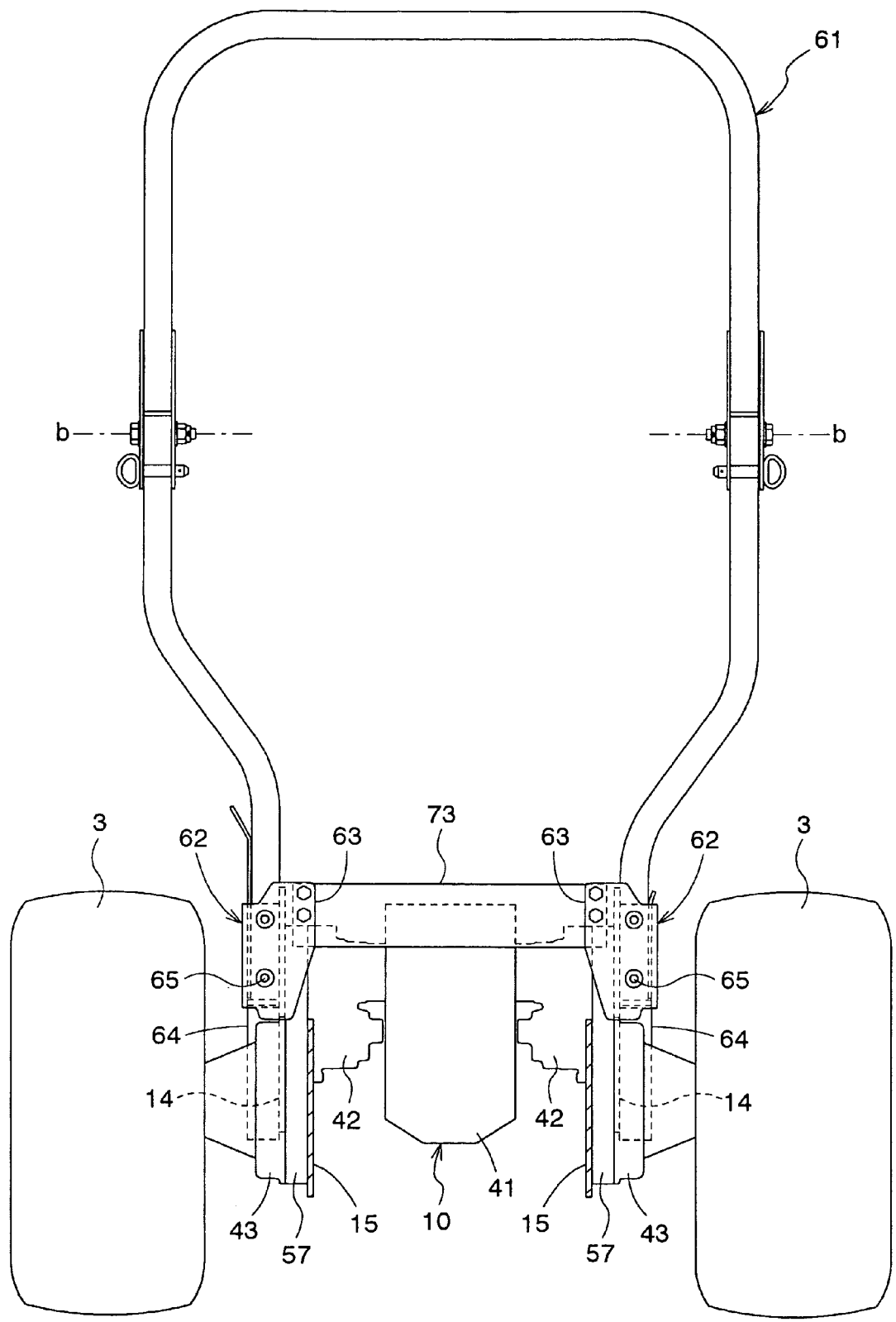
FIG. 14 is a rear view showing connections of a safety frame.
Figure 15:
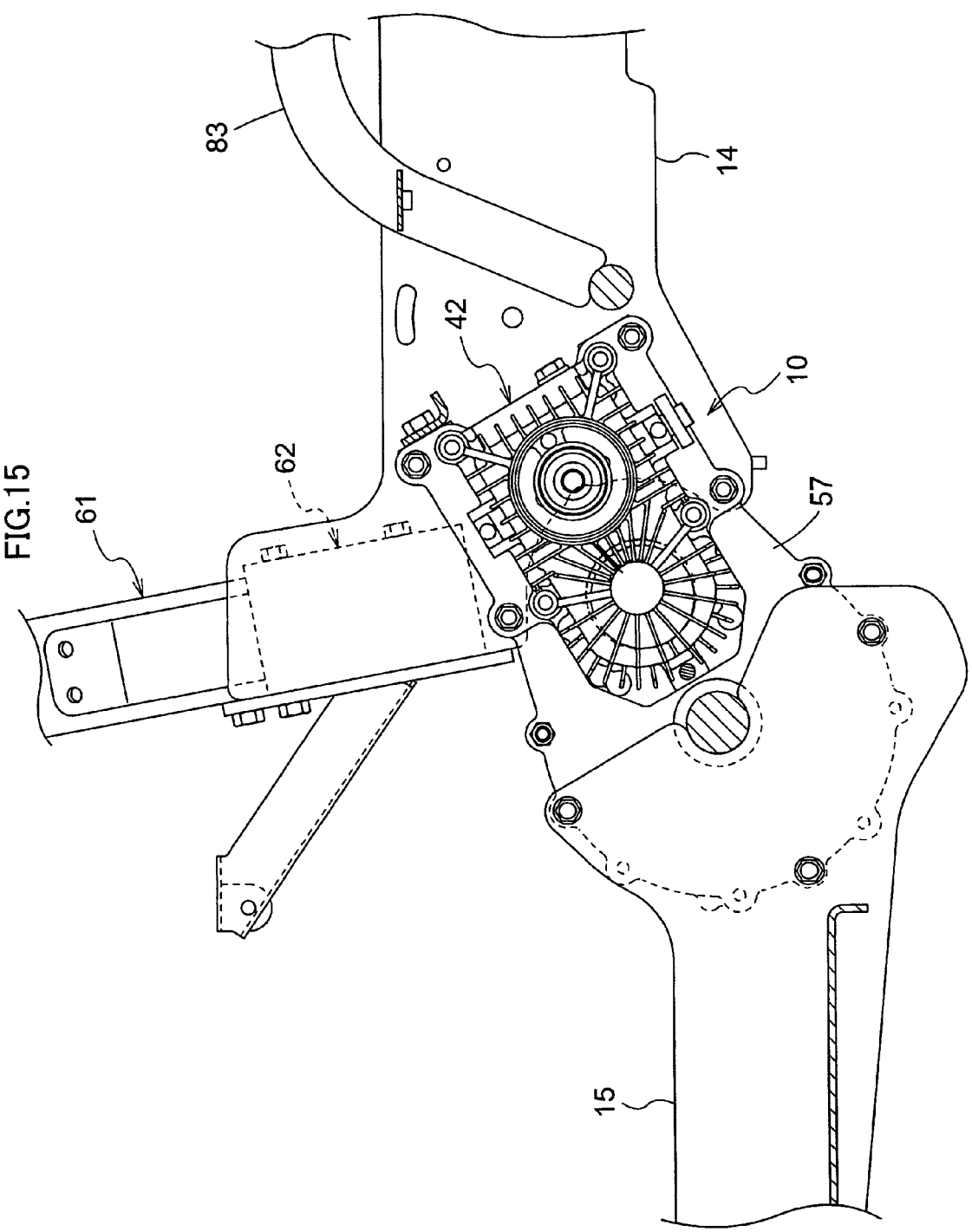
FIG. 15 is a right side view of the rear wheel drive section.
Figure 16:
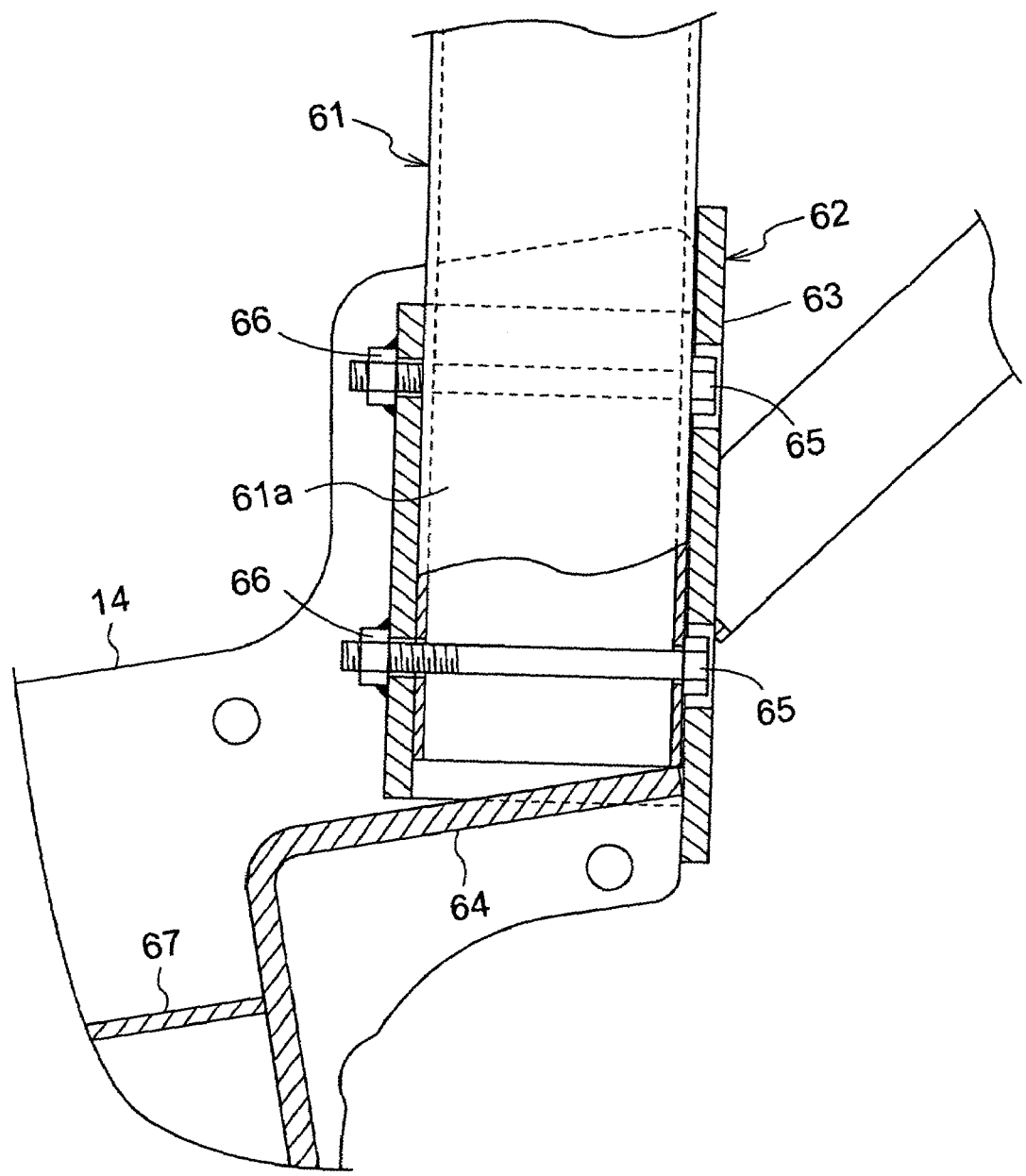
FIG. 16 is a side view, partly in section, showing a left proximal support of the safety frame.

As shown in FIG. 14, a gate-shaped safety frame 61, foldable backward about an axis "b" in the vertically middle portion thereof, is erected behind the driver's seat 6. The safety frame 61 has right and left proximal pole ends 61a supported by proximal supports 62 disposed on the rear outward surfaces of right and left rear longitudinal frames 14 of the body frame assembly 7. Each proximal support 62, as shown in FIGS. 15 and 16, includes a square boss member 63 rigidly welded to the outward surface of the rear longitudinal frame 14, and a bottom plate member 64 serving as a reinforcing plate rigidly welded to the outward surface of the rear longitudinal frame 14. A stay 73 interconnects the right and left square boss members 63 of the proximal supports 62 at rear surfaces thereof. With each proximal pole end 61a in the form of a square pipe is inserted from above into the proximal support 62 and received by the bottom plate member 64, bolts 65 inserted from behind through the proximal support 62 and the proximal pole end 61a are screwed into nuts 66 fixed to the front surface of the proximal support 62, whereby the bolt heads push the proximal pole end 61a forward and press it against the forward inner face of the proximal support 62. Thus the safety frame 61 is firmly fixed in its upstanding position. In this case, the bolts 65 may be handled with facility with a large space secured behind the safety frame 61.

A reinforcing member 67 is welded, with its plate surfaces oriented horizontally, to the outer surface of each rear longitudinal frame 14 in order to increase the strength of the frame 14. Further, front and rear ends of this reinforcing member 67 are welded to the rear surface of the second cross frame 13 of the front frame unit 7A and to the bottom plate member 64 of the proximal support 62. The reinforcing members 67 provided in this way strengthen the stepped connections between the two different width frames, i.e. the wide-width front frame unit 7A and the small-width rear frame unit 7B, and also strengthen the proximal supports 62 for supporting the upstanding safety frame 61.

What is claimed is:

1. A mid-mount mower having a mower unit mounted between a front wheel unit and a pair of right and left rear wheels arranged rearwardly of a vehicle body to be independently speed-shiftable, comprising:
    a front frame unit including a pair of right and left front longitudinal frames, a first cross frame interconnecting said front longitudinal frames in forward positions thereof longitudinally of the vehicle body, and a second cross frame interconnecting said front longitudinal frames in rearward positions thereof longitudinally of the vehicle body, said front frame unit supporting said front wheel unit and also supporting a lift mechanism for vertically movably suspending the mower unit;
    a rear frame unit including a pair of right and left rear longitudinal frames, said rear frame unit being connected to said front frame unit; and
    a rear wheel drive unit interconnecting said rear longitudinal frames;
    wherein said second cross frame has a mid-portion that defines a downwardly opening recess, said recess allowing entry thereto of an upwardly protruding portion of said mower unit without interference when said mower unit is raised by said lift mechanism, and
    wherein said second cross frame includes a first profile member having said mid-portion that is gate-shaped to define the recess and horizontal plate portions connected respectively to lower ends of said gate-shaped mid-portion, and a vertical plate member connected to a rear end surface of said first profile member.

2. A mid-mount mower as defined in claim 1, wherein said upwardly protruding portion of the mower unit is a gear case protrusively mounted on a mower deck.

3. A mid-mount mower as defined in claim 1, wherein said upwardly protruding portion of the mower unit is a universal joint connecting an input shaft of the mower unit to a drive transmission shaft.

4. A mid-mount mower as defined in claim 1, wherein said horizontal plate portions are arranged to receive rear ends of a footboard sheet member disposed as sunken between said right and left front longitudinal frames, and said vertical plate member having an upper end thereof supporting a pivotal axis of a driver's seat.

5. A mid-mount mower as defined in claim 1, wherein said second cross frame includes a rear wall member connected to a rear end of the vertical plate member to define therewith an internal space extending transversely of the vehicle body, and side plates for covering the internal space from lateral directions.

6. A mid-mount mower having a mower unit mounted between a front wheel unit and a pair of right and left rear wheels arranged rearwardly of a vehicle body to be independently speed-shiftable, comprising:

a front frame unit including a pair of right and left front longitudinal frames, a first cross frame interconnecting said front longitudinal frames in forward positions thereof longitudinally of the vehicle body, and a second cross frame interconnecting said front longitudinal frames in rearward positions thereof longitudinally of the vehicle body, said front frame unit supporting said front wheel unit and also supporting a lift mechanism for vertically movably suspending the mower unit;

a rear frame unit including a pair of right and left rear longitudinal frames, said rear frame unit being connected to said front frame unit; and a rear wheel drive unit interconnecting said rear longitudinal frames;

wherein said second cross frame has a downwardly opening recess disposed adjacent a middle position thereof such that a top surface of the recess is defined by a top portion of said second cross frame and wherein, said recess allowing entry thereto of an upwardly protruding portion of said mower unit without interference when said mower unit is raised by said lift mechanism.

7. A mid-mount mower as defined in claim 6, wherein the second cross frame has the top portion and a pair of generally vertically extending portions defining a part of the recess.

8. A mid-mount mower as defined in claim 7, wherein the second cross frame has a generally horizontally extending portion connected to a lower part of each of the pair of generally vertically extending portions.

9. A mid-mount mower as defined in claim 8, wherein the second cross frame has a vertical member connected to a rear edge of the pair of generally vertically extending portions.

10. A mid-mount mower having a mower unit mounted between a front wheel unit and a pair of right and left rear wheels arranged rearwardly of a vehicle body to be independently speed-shiftable, comprising:

a front frame unit including a pair of right and left front longitudinal frames, a first cross frame interconnecting said front longitudinal frames in forward positions thereof longitudinally of the vehicle body, and a second cross frame interconnecting said front longitudinal frames in rearward positions thereof longitudinally of the vehicle body, said front frame unit supporting said front wheel unit and also supporting a lift mechanism for vertically movably suspending the mower unit;

a rear frame unit including a pair of right and left rear longitudinal frames, said rear frame unit being connected to said front frame unit; and a rear wheel drive unit interconnecting said rear longitudinal frames;

a footboard having a foot-resting surface;

wherein said second cross frame has a downwardly opening recess disposed adjacent a middle position thereof such that a top surface of the recess is defined by a top portion of said second cross frame and wherein, said recess allowing entry thereto of an upwardly protruding portion of said mower unit without interference when said mower unit is raised by said lift mechanism, and wherein the top portion of said second cross frame is at a higher level than said foot-resting surface of the footboard.

* * * * *

UNITED STATES PATENT AND TRADEMARK OFFICE
CERTIFICATE OF CORRECTION

PATENT NO. : 7,059,109 B2 Page 1 of 1
APPLICATION NO. : 10/649332
DATED : June 13, 2006
INVENTOR(S) : Samejima et al.

It is certified that error appears in the above-identified patent and that said Letters Patent is hereby corrected as shown below:

Column 6, Line 44, Claim 1, "gate-shaped_to" should read -- gate-shaped to --

Signed and Sealed this

Twelfth Day of December, 2006

JON W. DUDAS
*Director of the United States Patent and Trademark Office*